(12) United States Patent
Smith et al.

(10) Patent No.: US 6,686,977 B2
(45) Date of Patent: Feb. 3, 2004

(54) LIQUID CRYSTAL ON SILICON DEVICE

(75) Inventors: Joseph Terence Smith, Chandler, AZ (US); Jerome A. Frazee, Milpitas, CA (US)

(73) Assignee: Three-Five Systems, Inc., Tempe, AR (US)

( * ) Notice: Subject to any disclaimer, the term of this patent is extended or adjusted under 35 U.S.C. 154(b) by 233 days.

(21) Appl. No.: 09/912,754

(22) Filed: Jul. 24, 2001

(65) Prior Publication Data

US 2003/0020846 A1 Jan. 30, 2003

(51) Int. Cl.$^7$ .................... G02F 1/136; G02F 1/1335; G02F 1/1343
(52) U.S. Cl. .................... 349/43; 349/114; 349/139
(58) Field of Search .................... 349/43, 114, 139

(56) References Cited

U.S. PATENT DOCUMENTS

| | | | | |
|---|---|---|---|---|
| 5,309,263 | A | | 5/1994 | Sato .................... 359/79 |
| 6,025,893 | A | | 2/2000 | Kadowaki et al. .................... 349/58 |
| 6,124,912 | A | * | 9/2000 | Moore .................... 349/113 |
| 6,180,430 | B1 | * | 1/2001 | Kong et al. .................... 438/30 |
| 6,195,140 | B1 | * | 2/2001 | Kubo et al. .................... 349/44 |
| 6,292,246 | B1 | * | 9/2001 | Shinohara et al. .................... 349/143 |
| 6,400,426 | B1 | * | 6/2002 | Yamazaki et al. .................... 349/43 |

FOREIGN PATENT DOCUMENTS

| | | | |
|---|---|---|---|
| EP | 0627644 | 12/1994 | ............ G02B/27/00 |
| EP | 0887695 | 12/1998 | ............ G02F/1/136 |
| EP | 0940708 | 9/1999 | ......... G02F/1/1335 |
| EP | 1037093 | 9/2000 | ............ G02F/1/136 |
| GB | 2266385 | 10/1993 | ............ G02B/23/10 |
| WO | 93/18428 | 9/1993 | ............ G02B/27/00 |
| WO | 97/09653 | 3/1997 | ......... G02F/1/1335 |
| WO | 00/41465 | 7/2000 | |

OTHER PUBLICATIONS

Alvelda, et al., "Ferroelectric Microdisplays Using Distortion–Compensated Pixel Layouts", SID International Symposium Digest of Technical Papers, 3 pages, May 1995.

Alvelda, "High–Efficiency Color Microdisplays", SID International Symposium Digest of Technical Papers, 4 pages, May 1995.

International Search Report for PCT/US02/22297, 6 pages, Feb. 6, 2003.

International Search Report for PCT/US96/14031, 3 pages.

* cited by examiner

*Primary Examiner*—Julie Ngo
(74) *Attorney, Agent, or Firm*—Baker Botts L.L.P.

(57) ABSTRACT

A liquid crystal on silicon device comprises a mirror layer comprising a plurality of mirror electrodes, a passivation layer formed on the surface of the mirror layer comprising a plurality of openings to the mirror electrodes, and a liquid crystal layer being arranged on top of the alignment layer. Ions trapped in the alignment layer are discharged through the opening by means of the mirror electrodes of the mirror layer.

25 Claims, 4 Drawing Sheets

LIQUID CRYSTAL ON SILICON DEVICE

FIELD OF THE INVENTION

The present invention relates to liquid crystal on silicon having pixel cell arrays for silicon light valves and in particular to microdisplays comprising a liquid crystal on silicon.

BACKGROUND OF THE INVENTION

Liquid crystal displays (LCDs) are commonly used in devices such as portable televisions, portable computers, control displays, and cellular phones to display information to a user. LCDs act in effect as a light valve, i.e., they allow transmission of light in one state, block the transmission of light in a second state, and some include several intermediate stages for partial transmission. When used as a high resolution information display, as in one application of the present invention, LCDs are typically arranged in a matrix configuration with independently controlled pixels (the smallest segment of the display). Each individual pixel is signaled to selectively transmit or block light from a backlight (transmission mode), from a reflector (reflective mode), or from a combination of the two (transflective mode).

LCDs are actuated pixel-by-pixel, either one at a time or a plurality simultaneously. A voltage is applied to each pixel mirror electrode and the liquid crystal responds to the voltage by transmitting a corresponding amount of light. In some LCDs an increase in the actuation voltage decreases transmission, while in others it increases transmission. When multiple colors are involved for each pixel, multiple voltages are applied to the pixel at different positions or times depending upon the LCD. Each voltage controls the transmission of a particular color. For example, one pixel can be actuated to allow only blue light to be transmitted while another allows only green. A greater number of different light levels available for each color results in a much greater number of possible combination colors.

Converting a complex digital signal that represents an image or video into voltages to be applied to the pixels of an LCD involves circuitry that can limit the monochrome resolution. The signals necessary to drive a single color of an LCD are both digital and analog. It is digital in that each pixel requires a separate selection signal, but it is analog in that an actual voltage is applied to the pixel to determine light transmission.

Each pixel in the core array of the LCD is addressed by both a column (vertical) driver and a row (horizontal) driver. The column driver turns on an analog switch that connects an analog voltage representative of the video input (control voltage necessary for the desired liquid crystal twist) to the column, and the row driver turns on a second analog switch that connects the column to the desired pixel.

The video inputs to the LCD are analog signals centered around a center reference voltage of typically from about 6.0 to 8.0 volts. This center reference voltage is not a supply or signal from anywhere, rather it is a mathematical entity. Nearly the same as the center reference voltage is a voltage called "VCOM," which connects to the LCD cover glass electrode, which is a transparent conductive coating on the inside face (liquid crystal side) of the cover glass. This transparent conductive coating is typically Indium Tin Oxide (ITO).

One frame of video pixels are run at voltages above the center reference voltage (positive inversion) and for the next frame the video pixels are run at voltages below the center reference voltage (negative inversion). Alternating between positive and negative inversions results in a zero net DC bias at each pixel.

FIG. 1 shows a cross-sectional view of adjacent LC transducer pixel cells in a conventional light valve. Light valve portion 100 comprises adjacent pixel cells 110a and 110b having liquid crystal (LC) material 111 sandwiched within gap 106 between a top plate and a bottom plate. Top plate 102 is composed of a translucent material, typically glass. The bottom plate is formed by the reflective metal pixel electrodes 112a and 112b of adjacent pixels 110a and 110b, respectively. These pixel electrodes function therefore as mirrors which reflect the light.

Pixel electrodes 112a and 112b are separated and electrically isolated by trench 118. Pixel electrodes 112a and 112b lie on top of an upper intermetal dielectric layer 128 that is one component of interconnect scheme 104. Interconnect 104 overlies capacitor structures 118a and 118b formed within underlying silicon substrate 105. Underlying capacitors 118a and 118b are in electrical communication with pixel electrodes 112a and 112b, respectively, through metal-filled vias 140 and middle interconnect metallization layer 124 and lower interconnect metallization layer 122. For protection and enhanced reflective characteristics a passivation layer and an alignment layer 116 are deposited on top of the pixel electrodes.

The conventional pixel array described above in FIG. 1 functions adequately in many applications. However, this design suffers from the disadvantage that such a display can experience image retention if mobile ions can enter and charge the liquid crystal alignment layer with the retained image resulting in significant degradation of a displayed image.

Therefore, there is a need in the art for a pixel array and a process of forming a pixel array where image retention is avoided.

SUMMARY OF THE INVENTION

The invention overcomes the above-identified problems as well as other shortcomings and deficiencies of existing technologies in one embodiment by a liquid crystal on silicon device comprising a mirror layer comprising a plurality of mirror electrodes, a passivation layer formed on the surface of the mirror layer comprising a plurality of openings to the mirror electrodes, and a liquid crystal layer being arranged on top of the alignment layer. Ions trapped in the alignment layer are discharged or electrochemically inverted to an inert state through the opening by means of the pixel electrodes of the mirror layer.

Another embodiment is a semiconductor arrangement within a liquid crystal on silicon device which comprises a substrate having a first and second surface. The substrate comprises a source/drain region which extends from the first surface into the substrate. The arrangement further comprises a dielectric layer deposited on the first surface of the substrate having a surface, a gate region within the dielectric layer, a mirror layer forming a plurality of pixel mirrors extending from the surface of the dielectric layer being electrically coupled with the source/drain region, a passivation layer formed on the surface of the mirror layer comprising an opening to the mirror region, and a liquid crystal alignment layer formed on the passivation layer.

The semiconductor arrangement can further comprise a conductive path reaching from the surface of the source/drain region to the mirror region. The conductive path can be formed by a first via coupling the source/drain region with a metallization layer embedded between the source/drain region and the mirror region and a second via coupling the metallization layer with the mirror region. The passivation layer can be a reflectivity enhancement coating comprising a silicon dioxide layer and a silicon nitride layer. Pluralities of these layers can be formed on top of the structure in an alternating fashion. The opening can be filled with conducting material or with the alignment layer. The conducting material can be one of tungsten, aluminum or wolfram and the opening can comprise a diameter of approximately 1 μm and have the shape of a circle.

A method of manufacturing a semiconductor arrangement according to another aspect of the present invention comprises the steps of:

forming a semiconductor device having a dielectric layer and a plurality of pixel mirror electrodes arranged on top of the dielectric layer;

forming a passivation layer on top of the pixel mirror electrodes;

etching an opening to the surface of the pixel mirror electrode in the passivation layer.

In one enhancement of the method a further step comprises forming of an alignment layer on top of the passivation layer. In another enhancement the opening is filled with a conductive material. The step of filling the opening with a conductive material can comprise the steps of:

forming a conductive layer on top of the passivation layer filling said opening;

removing the conductive layer thereby planarizing the surface of the semiconductor arrangement.

Another the step can comprise the forming of an alignment layer on top of the planarized surface.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
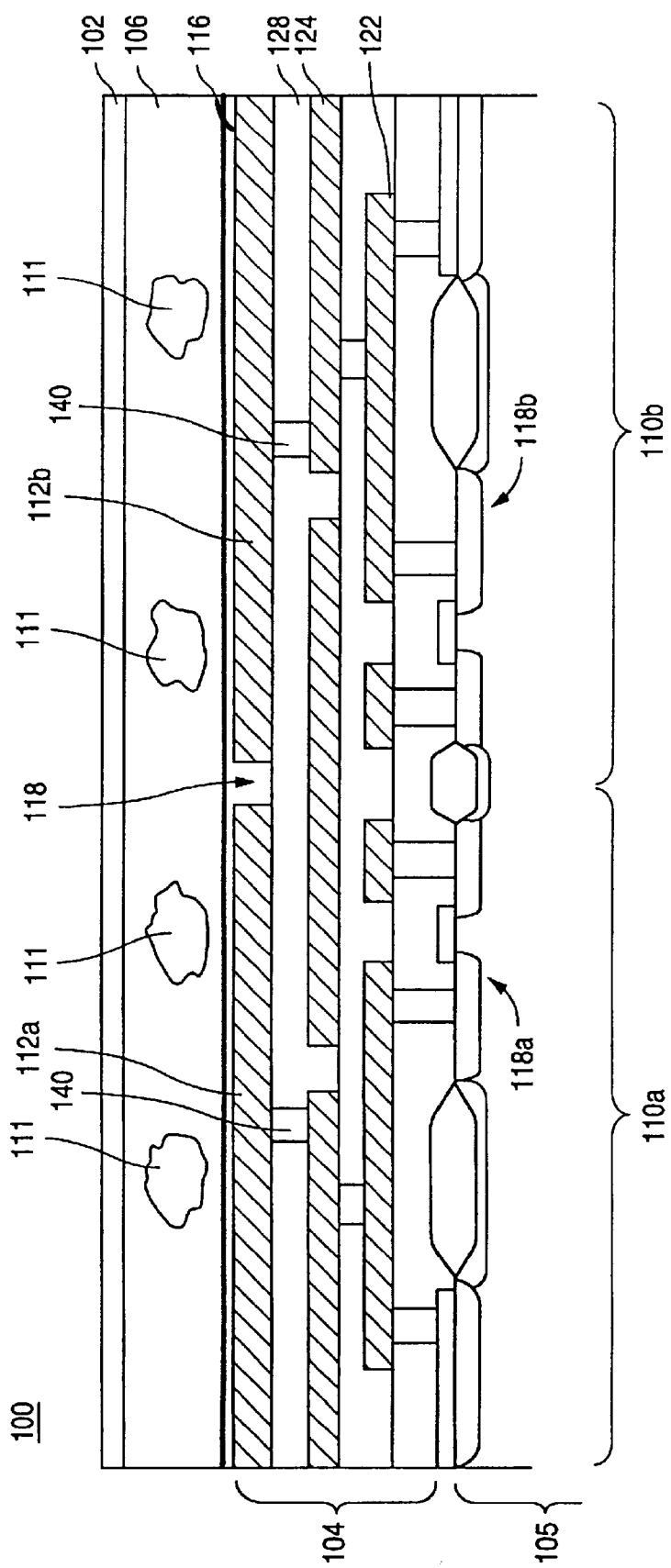
FIG. 1 shows a sectional view of a microdisplay according to the prior art.
Figure 2:
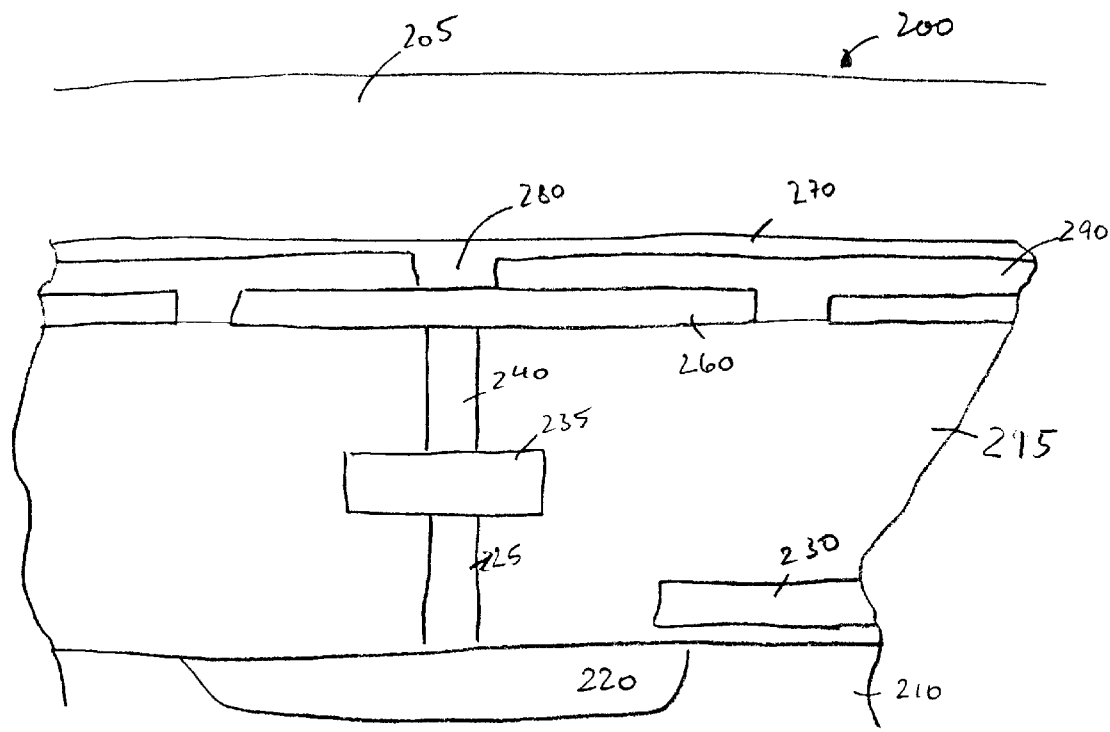
FIG. 2 shows a sectional view of a first embodiment according to the present inventon.

As described above, liquid crystal on silicon (LCOS) microdisplays can experience image retention if mobile ions can enter and charge the liquid crystal alignment layer. FIG. 2 shows a partial sectional view of a microdisplay, generally represented by the numeral 200, according to the present invention which avoids this effect. Only the relevant parts of the microdisplay according to the present invention are shown in this figure. A semiconductor substrate 210 comprises a region 220 which extends from the surface of the substrate 210 into the substrate. This region forms the drain or source of a NMOS field effect transistor. From the surface of this substrate 210 extends a dielectric layer such as an silicon dioxide layer 215. Within this layer is a gate 230 which slightly overlaps the source/drain region 220 and covers a channel of the NMOS field effect transistor. On the surface of the silicon dioxide layer is a plurality of reflective metal pixel electrodes 260 arranged. These pixel electrodes 260 form a pixel mirror. A interconnecting structure similar to those shown in FIG. 1 is formed by two vias 225 and 240 and an intermittent metal layer 235. This structure 225, 235, and 240 interconnects the source/drain region 220 with the pixel mirror electrode 260. Pixel electrode 260 is covered by a passivation layer 290. An opening 280 in passivation layer 290 is provided. On top of passivation layer 290 is a alignment layer 270 deposited. On top of this structure follows the liquid crystal layer 205, polarizer (not shown in FIG. 2), glass layer (not shown in FIG. 2), etc. as known from the prior art. Not shown is the electrical connection from the source/drain region 220 within each pixel to a pixel analog voltage storage capacitor that could be constructed using a top plate electrode of metal or polysilicon, an insulating layer, such as $SiO_2$, and a capacitor bottom plate that can be metal, polysilicon, or the silicon substrate.

The exemplary embodiment shown in FIG. 2 provides a unique method to discharge mobile ions which are trapped in the alignment layer 270 by incorporating a conductive path 280 from the liquid crystal alignment layer 270 to the LCOS pixel mirror electrode 260.

Mobile ions can be trapped in the liquid crystal alignment layer 270 unless a conductive path 280 is provided to the surface of the pixel electrode or pixel mirror electrode 260 in the passivation layer 290. Passivation layer 290 is required to provide scratch and corrosion protection of the highly reflective aluminum mirror surface plus to provide a barrier against mobile ion penetration into the active transistor circuitry which may degrade the silicon device reliability. Additionally, the passivation layer 290 improves the light reflectivity by incorporating alternating dielectric layers with different indices of refraction. To preserve integrity of the mobile ion barrier, the conductive path 280 needs to be opened up over the top of each pixel mirror electrode 260 (only one shown in FIG. 2), which allows the pixel mirror electrode 260 to also function as a mobile ion barrier. Mobile ions in the material above passivation layer 290 will then be prevented from reaching the NMOS transistor gate 230 and the source/rain region 220.

Figure 3:
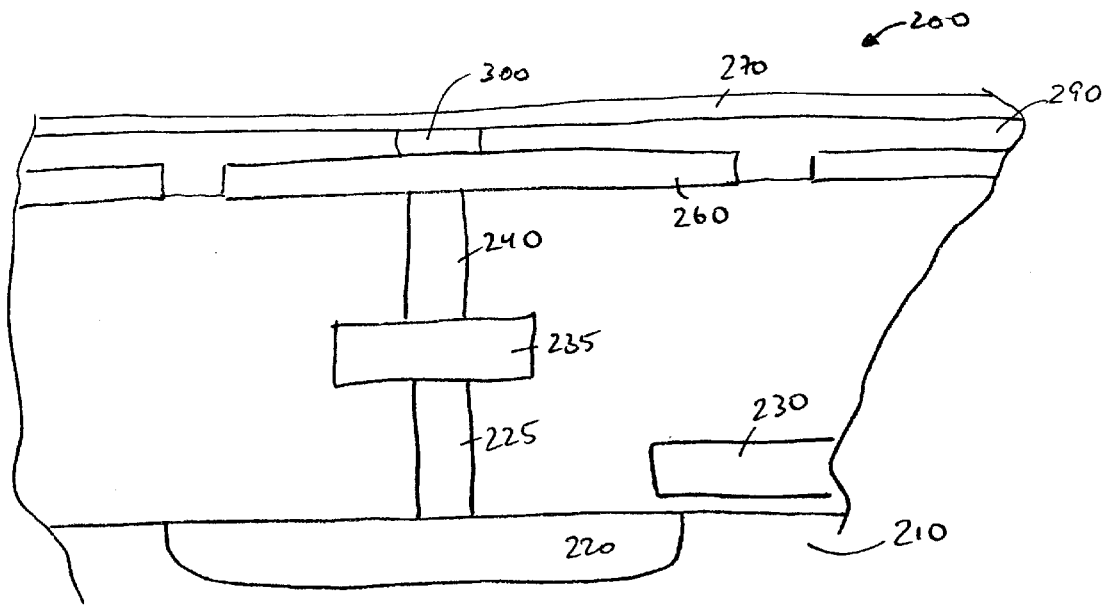
FIG. 3 shows a sectional view of a second embodiment according to the present invention.

FIG. 3 shows another embodiment of the present invention. Same numerals depict similar elements. The opening in passivation layer 290 in this embodiment is filled with a conductive material, such as wolfram, aluminum or tungsten. The alignment layer 270 is placed on top of the passivation layer. The opening in passivation layer 290 comprises a size of preferably 0.5 μm thus forming a via 300. The integrity of the passivation layer will practically not be affected by such a small opening. However, the electrical connection between the alignment layer 270 and the pixel mirror electrode 260 provides the effect of neutralizing the effect of any ions trapped in the alignment layer 270 and liquid crystal material directly above the alignment layer.

Figure 4:
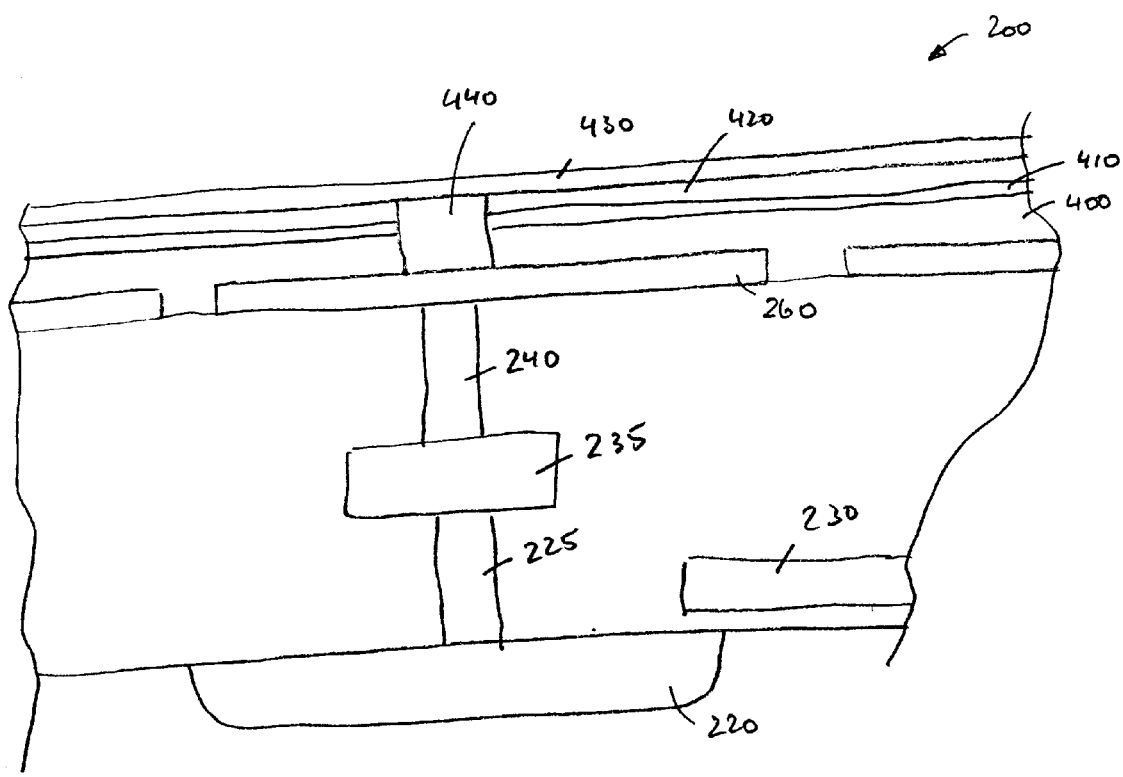
FIG. 4 shows a sectional view of a third embodiment according to the present invention.

FIG. 4 shows yet another embodiment of the present invention. This embodiment shows a more detailed structure of the passivation layer and the alignment layer. Again, same numerals depict similar elements. A layer of silicon dioxide is used as a first layer 400 of a multi-layer passivation layer.

In this embodiment, the passivation layer consists of three alternating layers of silicon dioxide and silicon nitride. The second layer 410 is deposited on top of the first layer 400 and is made of silicon nitride. On top of this layer 410 is another layer 420 deposited which again is a silicon dioxide layer. These layers form a so called reflectivity enhancement coating (REC-layer) directly above the pixel mirror electrodes 260. A plurality of those layers can be deposited on top of the pixel mirror electrodes 260 to form the passivation layer. Again, a via 440 is formed in the REC-layer and filled with conducting material, such as tungsten or aluminum. On top of the passivation layer there is again deposited an alignment layer 430. The via 440 electrically couples the alignment layer 430 with the pixel mirror electrode 260.

Figure 5A:
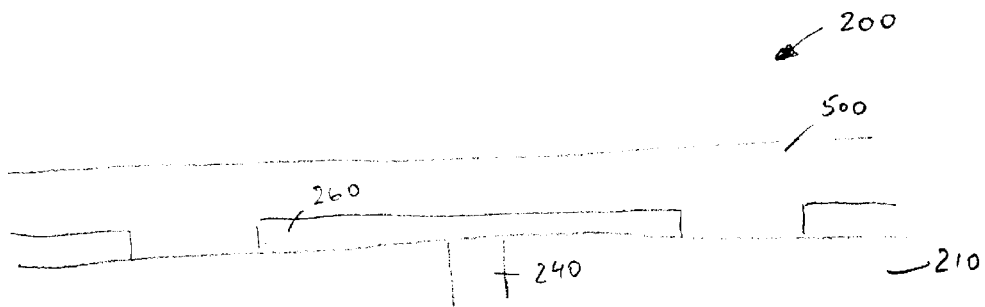
FIGS. 5A–5E show sectional views of different steps during the manufacture of a semiconductor arrangement according to one embodiment of the present invention.
Figure 5B:
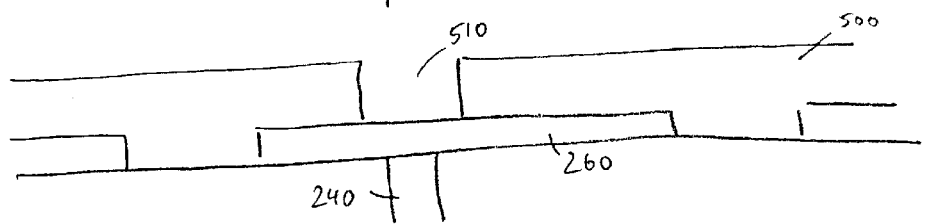
Figure 5C:
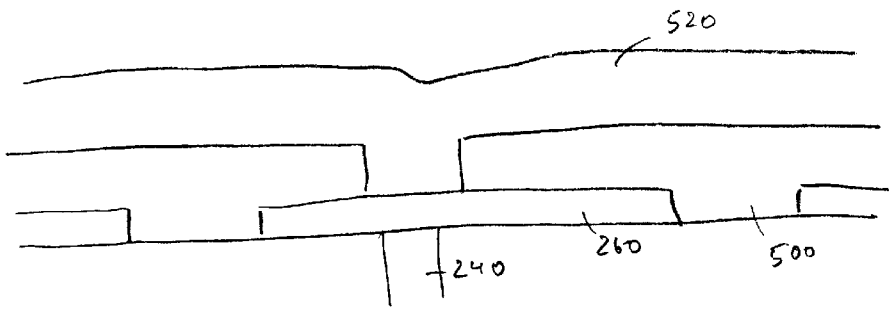

FIGS. 5A–E show different steps of an exemplary method of manufacturing a semiconductor arrangement suitable for a microdisplay according to the present invention. Again, the same numerals refer to the same or similar elements throughout the figures. FIG. 5A depicts a partial view of a semiconductor substrate on top of which a silicon dioxide layer 210 is deposited. Vias 240 are formed within the dielectric layer 210 which can be silicon dioxide, for example, by means of etching and then filled with electrically conducting material as known in the art. Pixel mirror electrodes 260 are then formed on top of this layer 210. To this end, a reflective metal layer is deposited on top of layer 210 followed by a photoresist mask to define the pixel areas proper. Through etchings the respective pixel mirror electrodes 260 are formed. A passivation layer 500 is then formed on top of this structure, for example, by deposing respective material on top of the surface of the semiconductor arrangement. By means of a standard semiconductor photolithographic process, a mask is processed on top of passivation layer 500 to pattern the required opening in the passivation layer 500. An etching process is then used to remove the passivation material and expose the surface of pixel mirror electrodes 260 through via 510 as shown in FIG. 5B. During the next step, as shown in FIG. 5C. The construction of the path (via) to the surface of the pixel mirror electrodes 260 can be considered complete in one embodiment of the present invention.

Figure 6:
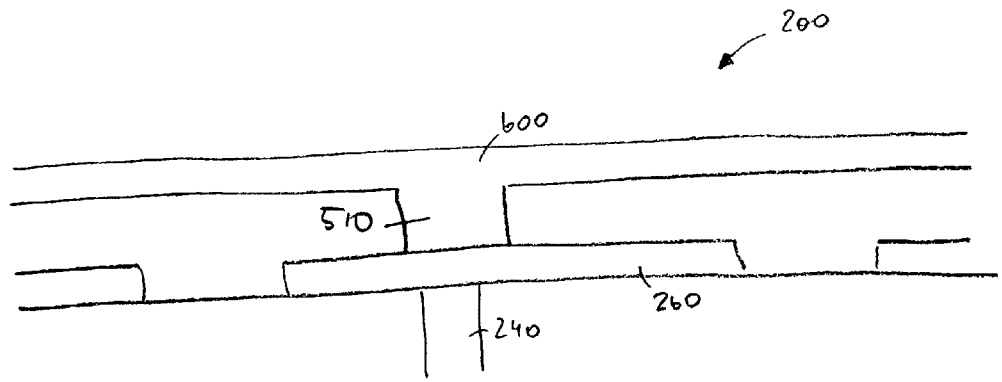
FIG. 6 shows another sectional view of a steps during the manufacture of a semiconductor arrangement according to another embodiment of the present invention.

FIG. 6 shows this embodiment after forming of an alignment layer 600 on top of the surface of the arrangement. The alignment layer 600 is electrically coupled through via 510 with pixel mirror electrode 260 by simply contacting it. Thus, any effects caused by trapped ions are avoided as charges which can build up by ions in this layer are discharged or electrochemically reacted through the conducting vias 510 and the respective pixel mirror electrodes 260.

Figure 5D:
Figure 5E:
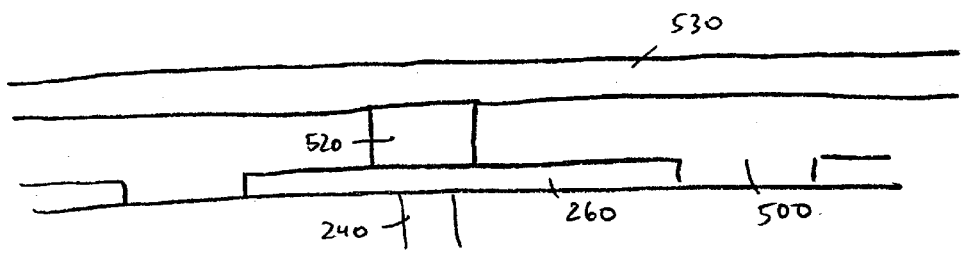

A further improvement of the embodiment shown in FIG. 6 will now be explained in combination with FIGS. 5C–5E. After the step shown in FIG. 5B, an additional step to improve the microdisplay performance will be provided as shown in FIG. 5C. The etched via 510 can be filled with conducting material 520. In a next step, as shown in FIG. 5D, the surface of the semiconductor arrangement will be planarized to remove all of the conducting material from the surface of the passivation layer 500 and only leave the conducting material 520 inside of the etched opening. Ensuring that the entire microdisplay surface is optically flat will eliminate liquid crystal layer alignment problems resulting from the change in surface topography over the etched out hole 510. The result of this step is shown in FIG. 5D. Again as a final step the alignment layer 530 is deposited on the flat surface of the passivation layer 500, as shown in FIG. 5E. Alternatively, the conductive material can be selectively deposited to only fill the etched opening to construct the same structure.

Passivation layer 500 can consist of multiple layers to form a reflectivity enhancement coating as described in combination with FIG. 4. A polyimide layer can be used as an alignment layer. The via 510 can have a variety of shapes, such as a circle, a square, a hexagon, etc. The size of the opening can range from the minimum feature size that present semiconductor technology is capable of patterning and etching to removing the passivation from the entire surface of the pixel mirror electrode. Larger openings provide a faster discharge path and reaction surface but with the trade off of lower reflectivity due to less of the mirror electrode being covered with the REC coating. In particular with the embodiment shown in FIG. 6, a 1 µm will not effect alignment tolerances which are in the +/−4 µm range.

While the present embodiments are susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. For example, the embodiments shown and explained can drive other types of displays which show similar unwanted characteristics when the dwelling time of a pixel signal is changing.

What is claimed is:

1. Semiconductor arrangement within a liquid crystal on silicon device, comprising:
    a substrate having a surface and comprising a source/drain region which extends from the substrate surface into said substrate;
    a dielectric layer formed on the substrate surface, said dielectric layer having a surface;
    a gate region within said dielectric layer;
    a mirror layer forming a plurality of pixel mirrors extending on the surface of said dielectric layer and being electrically coupled to said source/drain region;
    a passivation layer formed on said mirror layer, said passivation layer having an opening to a region of said mirror layer, wherein the opening is filled with conductive material; and
    a liquid crystal alignment layer formed on said passivation layer.

2. Semiconductor arrangement according to claim 1, further comprising a conductive path from the surface of said source/drain region to the region of said mirror layer.

3. Semiconductor arrangement according to claim 2, wherein conductive path comprises a first via coupling said source/drain region with a metallization layer embedded between said source/drain region and the region of said mirror layer and a second via coupling said metallization layer with the region of said mirror layer.

4. Semiconductor arrangement according to claim 1, wherein said passivation layer is a reflectivity enhancement coating.

5. Semiconductor arrangement according to claim 4, wherein said reflectivity enhancement coating comprises a silicon dioxide layer and a silicon nitride layer.

6. Semiconductor arrangement according to claim 5, wherein said reflectivity enhancement coating comprises a plurality of alternating layers of silicon dioxide and silicon nitride, respectively.

7. Semiconductor arrangement according to claim 1, wherein the conductive material is one selected from the group consisting of tungsten, aluminum and wolfram.

8. Semiconductor arrangement according to claim 1, wherein a diameter of the opening in said passivation layer is approximately 1 µm.

9. Semiconductor arrangement according to claim 1, wherein the opening in said passivation layer is circular in shape.

10. Method of manufacturing a semiconductor arrangement, comprising the steps of:

forming a semiconductor device having a dielectric layer and a plurality of pixel mirror electrodes arranged on said dielectric layer;

forming a passivation layer on said pixel mirror electrodes;

forming at least one opening in said passivation layer to at least one of said pixel mirror electrodes; and filling the at least one opening with a conductive material.

11. Method according to claim 10, wherein the diameter of the opening in said passivation layer is about 1 µm.

12. Method according to claim 10, wherein said passivation layer is a reflectivity enhancement coating.

13. Method according to claim 12, wherein forming of said reflectivity enhancement coating comprises the steps of forming a silicon dioxide layer and forming a silicon nitride layer.

14. Method according to claim 13, wherein a plurality of alternating layers of silicon dioxide and silicon nitride are deposed.

15. Method according to claim 10, further comprising the step of forming an alignment layer on said passivation layer.

16. Method according to claim 10, wherein the step of filling the at least one opening with a conductive material comprises the steps of:

forming a conductive layer on a surface of said passivation layer, thereby filling the at least one opening in said passivation layer with the conductive material;

removing said conductive layer, thereby planarizing the surface of said passivation layer.

17. Method according to claim 16, further comprising the step of forming an alignment layer on the planarized surface of said passivation layer.

18. Method according to claim 10, wherein the step of filling the at least one opening with a conductive material comprises the step of selectively filling the at least one opening with the conductive material.

19. Liquid crystal on silicon device comprising:

a mirror layer comprising a plurality of mirror electrodes;

a passivation layer on the plurality of mirror electrodes;

a plurality of openings in said passivation layer to the plurality of mirror electrodes, wherein said plurality of openings are opening filled with conductive materials;

a liquid crystal alignment layer on said passivation layer; and a liquid crystal layer on said liquid crystal alignment layer.

20. Liquid crystal on silicon device according to claim 19, wherein said passivation layer is a reflectivity enhancement coating.

21. Liquid crystal on silicon device according to claim 20, wherein said reflectivity enhancement coating comprises a silicon dioxide layer and a silicon nitride layer.

22. Liquid crystal on silicon device according to claim 21, wherein said reflectivity enhancement coating comprises a plurality of alternating layers of silicon dioxide and silicon nitride, respectively.

23. Liquid crystal on silicon device according to claim 19, wherein the conductive material is one selected from the group consisting of tungsten, aluminum and wolfram.

24. Liquid crystal on silicon device according to claim 19, wherein the diameter of each of the plurality of openings is approximately 1 µm.

25. Liquid crystal on silicon device according to claim 19, wherein the opening in said passivation layer is circular in shape.

* * * * *

UNITED STATES PATENT AND TRADEMARK OFFICE
CERTIFICATE OF CORRECTION

PATENT NO. : 6,686,977 B2
DATED : February 3, 2004
INVENTOR(S) : Smith et al.

It is certified that error appears in the above-identified patent and that said Letters Patent is hereby corrected as shown below:

<u>Title page,</u>
Item [73], Assignee, location should be -- Tempe, AZ (US) --

Signed and Sealed this

Twentieth Day of April, 2004

JON W. DUDAS
*Acting Director of the United States Patent and Trademark Office*